US011327933B2

(12) United States Patent
Gruszecki et al.

(10) Patent No.: US 11,327,933 B2
(45) Date of Patent: May 10, 2022

(54) MIGRATING A MULTI-LEVEL SECURED DATABASE

(71) Applicant: International Business Machines Corporation, Armonk, NY (US)

(72) Inventors: Artur M. Gruszecki, Cracow (PL); Tomasz Kazalski, Balice (PL); Tomasz Sekman, Cracow (PL); Michal Bodziony, Tegoborze (PL); Rafal Korczyk, Bielsko-Biala (PL)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 16/276,746

(22) Filed: Feb. 15, 2019

(65) Prior Publication Data

US 2020/0265026 A1 Aug. 20, 2020

(51) Int. Cl.
*G06F 16/21* (2019.01)
*G06F 21/62* (2013.01)
*G06F 16/22* (2019.01)

(52) U.S. Cl.
CPC .......... *G06F 16/214* (2019.01); *G06F 16/221* (2019.01); *G06F 16/2282* (2019.01); *G06F 21/6227* (2013.01)

(58) Field of Classification Search
CPC ............... G06F 16/119; G06F 21/6236; G06F 16/214; G06F 2221/2113; G06F 16/283; G06F 21/62; G06F 3/0622; G06F 3/062; G06F 16/221; G06F 21/6227; G06F 16/2282
See application file for complete search history.

(56) References Cited

U.S. PATENT DOCUMENTS

| 7,539,682 | B2* | 5/2009 | Rubin | G06F 21/6227 |
| 7,620,665 | B1* | 11/2009 | George | G06F 16/214 |
| 8,478,713 | B2* | 7/2013 | Cotner | G06F 16/21 |
| | | | | 709/216 |
| 9,569,514 | B2 | 2/2017 | Lu et al. | |
| 2010/0050267 | A1* | 2/2010 | Nochta | G06F 21/6236 |
| | | | | 726/27 |
| 2017/0116295 | A1* | 4/2017 | Wan | G06F 16/254 |

(Continued)

OTHER PUBLICATIONS

IBM, "IBM PureData System for Analytics, Version 7.1: Security Labels", 2014 (Year: 2014).*

(Continued)

*Primary Examiner* — David T. Brooks
*Assistant Examiner* — Lana Alagic
(74) *Attorney, Agent, or Firm* — Tyrus Cartwright

(57) ABSTRACT

In an approach for migrating database content with row-level security from a source database with row-level security to a target database without row-level security, a computer determines a type of the source database to be migrated, and upon determining that a source table of the source database is maintained using multi-level security attributes, creating a data structure for a source table of the source database for storing meta-data comprising the multi-level security attributes, determining all dimensions of the multi-level security attributes, adding columns to a target table of the target database relating to the source table, the added columns representing the multi-level security attributes of the source table.

20 Claims, 5 Drawing Sheets

(56) References Cited

U.S. PATENT DOCUMENTS

| | | | |
|---|---|---|---|
| 2017/0286475 A1 | 10/2017 | Cadarette et al. | |
| 2017/0344749 A1* | 11/2017 | Yang | G06F 16/25 |
| 2018/0096001 A1 | 4/2018 | Soza | |
| 2018/0137186 A1 | 5/2018 | Brodt et al. | |
| 2019/0340283 A1* | 11/2019 | Schneider | G06F 16/24542 |

OTHER PUBLICATIONS

Oracle, "Oracle Database Concepts: Data Blocks, Extents, and Segments", 2005, 10g Release 2 (10.2) (Year: 2005).*

Maatuk et al., "Relational Database Migration: A Perspective", DEXA 2008, LNCS 5181, pp. 676-683, 2008, © Springer-Verlag Berlin Heidelberg 2008, <https://link.springer.com/chapter/10.1007%2F978-3-540-85654-2_58>.

\* cited by examiner

202

| NAME | LEVEL |
|---|---|
| PUBLIC | 0 |
| CONF | 10 |
| SECURE | 1000 |
| OMNI | 32767 |

204

| NAME | UNIQUE NUMBER | MAPPED VALUE |
|---|---|---|
| PUB | 1 | 00000001 |
| AUDIT | 2 | 00000010 |
| SUPER | 3 | 00000100 |
| OMNI | 128 | 11111111 |

206

```
            ALL
           /   \
         DEP1   DEP2
        / | \   | \
     DEP3 UN2 UN3 UN4 UN5
      |
     UN1
```

FIG. 2

MIGRATING A MULTI-LEVEL SECURED DATABASE

BACKGROUND

The present invention relates generally to the field of database migration, and more particularly to migrating database content with row-level security from a source database to a target database while preserving security access privileges.

Storing data securely continues to be one of the key objectives of enterprise IT (information technology) organizations. Concepts, like data warehousing, large data, cross-functional analytics, continuous learning and similar, require the capability to store more and more data from daily business operations as well as machine data and/or operational data.

In many cases databases, in particular relational databases, are used for storing the data. Because of cross-functional and cross-application access to the data, e.g., for analytical tasks, controlling and securing access to the data, in particular in light of governmental requirements becomes paramount. Special considerations regarding data privacy need to be made. One of the concepts supporting multilevel security of high granularity and data access is known as row-level security. The database feature known as row-secure tables (RST) has been introduced into database systems for enhanced data access control. In a nutshell, the row-secure table can be seen as a table with security labels per row used to filter out data (rows) based on defined user privileges. Consequently, two users with different privileges obtain a different set of the rows of the same SQL (structured query language) executed against the same RST at the same time.

Different database vendors are using different ways of defining the control access privileges for RSTs. One of them is implementing the abstract security model known as Multi-Level Security (MLS). In some instances, more than one dimension of security labels may be maintained which may be applied separately or together to a single row in a relational database.

SUMMARY

According to one embodiment of the present invention, a computer-implemented method for migrating database content with row-level security from a source database to a target database may be provided. The data of the source database may be organized in tables with rows and columns, wherein rows may be grouped in storage regions. The method may comprise determining a type of the source database to be migrated, and upon determining that a source table of the source database is maintained using multi-level security attributes, creating a data structure for a source table of the source database for storing meta-data comprising the multi-level security attributes, determining dimensions of the multi-level security attributes, and adding columns to a target table of the target database relating to the source table. The added columns may represent the multi-level security attributes of the source table. Thereby, a migration of the source table from the source database supporting row-level security to the target database not supporting row-level security may be enabled.

According to another embodiment of the present invention, a database migration system for migrating database content with row-level security may be provided. The data of the source database may be organized in tables with rows and columns, wherein rows may be grouped in storage regions. The system may comprise a first determination unit adapted for determining a type of the source database to be migrated, and upon determining, by the first determination unit, that a source table of the source database is maintained using multi-level security attributes, triggering the following units: a creation unit adapted for creating a data structure for a source table of the source database for storing meta-data comprising the multi-level security attributes, a second determination unit adapted for determining dimensions of the multi-level security attributes, and an adding unit adapted for adding columns to a target table of the target database relating to the source table. The added columns may represent the multi-level security attributes of the source table. Thereby, the database migration system may enable a migration of the source table from the source database supporting row-level security to the target database not supporting row-level security.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

FIG. 2 shows a block diagram of an embodiment and dimensions of a multi-level security ("MLS") concept.

DETAILED DESCRIPTION

Figure 1:
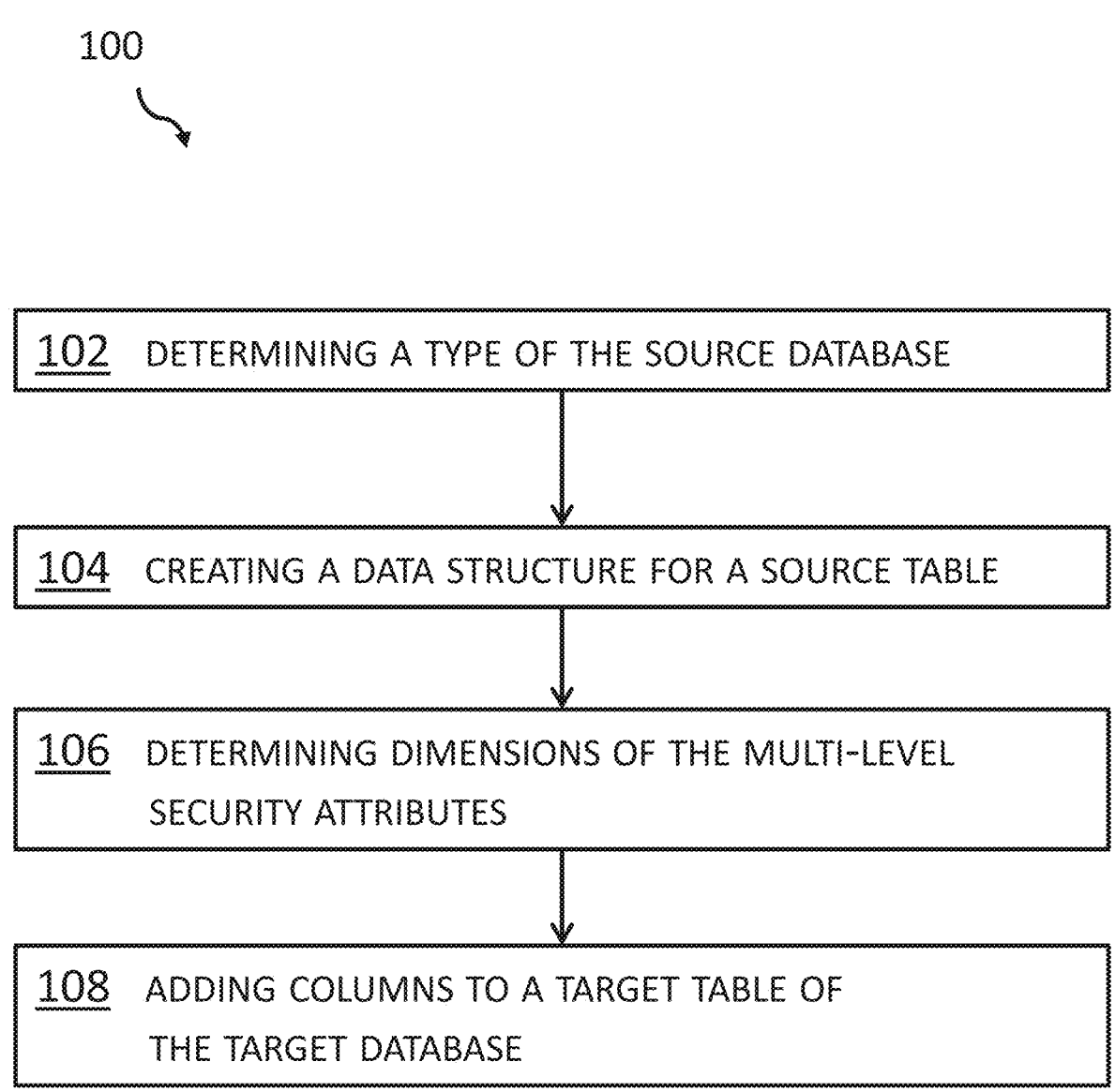
FIG. 1 shows a flow diagram of an embodiment of a computer-implemented method for migrating database content with row-level security from a source database to a target database.

In the context of this description, the following conventions, terms and/or expressions may be used:

The term 'migrating' may denote that data may be moved, e.g., be copied, from one storage environment, e.g., a source database, to another storage environment, a target database. The source of the target database may have different row-level security concepts. Here, the source database may support at least row-level security and optional multi-level-security features per database table row.

The term 'database content' may denote any data stored in a database, in particular the source database.

The term 'database' may denote here a system for a management of data, in particular in rows, such as database records and columns, i.e., a relational database management system.

The term 'row-level security' may denote a feature of a user access right to defined individual rows of a table according to a dedicated security or access right concept. In this context, the term 'access right' may denote the allowance or privilege to read, write or delete data in a data storage system, e.g., a database system. Access rights may be defined for a user or a system, e.g., an application according to a variety of different dimensions, such as per table, per column, per row, per record, per time frame, and so on. The concept of row-level security, as a special access right concept, may play a predominant role in this document. This concept may be used in highly complex database management systems in order to ensure and implement, e.g., data privacy regulations.

The term 'storage region' may denote a group of database rows that may be manageable together. The size of the storage region may be identical to a block size of an underlying storage system like a spinning disk, a flash memory system or a tape archive system. The term storage region may also be denoted as extent.

The term 'block size' may denote the size of a physical or logical storage block of a storage device. Typical block sizes may be 4 kilobyte, 8 kilobyte or 16 kB. Block IDs (identifies) may be used for a quick navigation within a storage device.

As is known in the art, databases with row-secure source table ("RST") are not available in all IT environments. Therefore, it may be required to migrate database content from one database environment to another database environment, including a migration of database content from the database having the RST feature to another database without the RST feature. Because applications should be used more or less unchanged, in particular not with fewer security features, IT managers have faced a difficult task when a mixed-feature-rich database portfolio has to be used. Embodiments of the present invention for migrating database content with row-level security from a source database to a target database may offer multiple advantages and technical effects. Embodiments of the present invention allow migrating database content from a database with row-level security or multilevel security features to another database without these features, while preserving the security access privileges. Thus, it becomes possible to back-up content from a database with a rich set of security features (row-level or multilevel security) to a database environment not providing such a fine-grained set of control features of user access rights.

The fine-grained control features for user access rights, in particular, multi-dimensional access right management to rows/records of a database table, may also be migrated to the target database environment without providing features for multidimensional access right management to rows/records. This may enhance operational options in highly scalable computing environments, e.g., cloud computing centers, or, if an application may need to run (and be operated) against a database not supporting row-level security but which concerned application has been designed requiring these features. This may increase choices for database managers in their selection of database types. It may also be noted, that the proposed concept may also be implemented using column-based databases instead of relational databases and/or also hierarchical databases as target databases.

In the following, additional embodiments, applicable to the method as well as to the related system, will be described.

According to one preferred embodiment of the method, in each of the storage regions a number of rows may be stored, defined by a block size of the database and the length of the rows such that a maximum number of rows may fit into the storage region. Thus, a maximum number of database records or rows may be stored in a given storage region. Hence, all rows of a given database table may be stored in a group in the storage region and may be managed together allowing a higher performance of the database system if compared to a traditional database management approach without storage regions.

According to one embodiment, the method may also comprise: upon determining that one of the dimensions may comprise a level label indicative of a level access right, adding a level access right column to the table of the target table. Such level access right, e.g., as variable MLS_LEVEL_integer, may be implemented as an integer value. This may allow a large number of different access rights for user accesses to data in the database.

According to another embodiment, the method may also comprise: upon determining that one of the dimensions may comprise a category label indicative of a category level access right, adding a category access right column to the table of the target table. Thereby, the category access right column may support N different categories, determined during the step of determining dimensions of the multi-level security attributes. Such an access right may be controlled by a binary variable, e.g., MLS_CATEGORY_binary(N). This may represent a second dimension of access rights.

According to yet another embodiment, the method may also comprise: upon determining that one of the dimensions may comprise a cohort label indicative of a cohort access right, adding a cohort access right column to the table of the target table. Thereby, the cohort access right column may support M different leaves, determined during the step of determining dimensions of the multi-level security attributes. Such an additional access right level may be controlled by another binary variable, e.g., MLS_COHORT_binary (M). This may represent a third dimension of access rights in the multi-level access right concept.

According to another embodiment, the method may also comprise adding a mapping table to the target database for mapping the multi-level security attributes with the following structure:

TABLE MLS_MAPPING (
MLS_TYPE VARCHAR(10),
MLS_BINARY binary(Z),
MLS_LABEL,
where Z is max (M, N)).

The structure above allows mapping the multi-dimensional security attributes related to the different dimensions of the access rights from the source database to the target database not supporting multilevel access rights.

According to one further embodiment, the method may also comprise copying user data row-wise from the source table to the target table, and inserting the determined multi-level security attributes row-wise to the target table. Thus, also the target database may now be equipped with the information to manage access rights at row-level, although the native implementation of the target database does not support such fine-grained access technique.

According to one additional embodiment, the method may also comprise adding data into the mapping table MLS_MAPPING as follows: for a category access right: adding all determined categories with bit codes; and for a cohort access right: adding bit codes for all leaves and all nodes above them. Hence, a strictly hierarchical access right structure may be implemented for the target database.

In embodiments of the invention, the target database may be a relational database, a column-based database, or a hierarchical database. Thus, most known database technologies may be supported by the here proposed method, although the performance of the different database types may vary between the different implementation options.

In the following, a detailed description of the figures will be given. All instructions in the figures are schematic. Firstly, a block diagram of an embodiment of the inventive computer-implemented method for migrating database content with row-level security from a source database to a target database is given. Afterwards, further embodiments, as well as embodiments of the database system for migrating database content with row-level security, will be described.

FIG. 1 shows a block diagram of an embodiment of the computer-implemented method 100 for migrating database content from a source database providing row-level security to a target database. The source database with row-level security features may be a relational database in which the data of the source database are organized in tables with rows and columns. Additionally, the rows of a table are grouped in storage regions, i.e., extents. The method 100 comprises determining, 102, a type of the source database to be migrated. In embodiments, the type of the source database to be migrated is obtained from a database dictionary directly by selecting the table attributes, or using a dedicated API function.

Upon determining that a source table of the source database is a RST maintained using multi-level security attributes, the method 100 comprises creating, 104, a data structure for a source table of the source database for storing meta-data comprising the multi-level security attributes, and determining, 106, dimensions of the multi-level security attributes; i.e., analyzing the multi-level security attributes of the source table.

Furthermore, the multi-level security of the source database is analyzed, and the method 100 comprises adding, 108, columns to a target table of the target database relating to the source table, the added columns representing the multi-level security attributes (i.e., RST metadata) of the source table, thereby migrating the source table from the source database supporting row-level security to the target database not supporting row-level security, and preserving the security metadata.

FIG. 2 shows tables and hierarchical diagrams instrumental for describing the multi-levels security concept. Table 202 shows a simple level structure. Four levels increasingly growing user access privileges are defined: PUBLIC, CONF, SECURE, OMNI. The related access security levels are 0, 10, 1000, 32767. In the table 202 example, the granularity of the access right levels may be limited to $2^{15}$ different levels from which here only four are named, as an example. The level values are integer values: e.g., zero, ten, one-thousand. In embodiments, if a level access right is used for the source table, a "MLS_LEVEL integer" column is added.

Table 204 illustrates the concept of the category access right. Four categories increasingly growing user access privileges are defined: PUB, AUDIT, SUPER, OMNI. The second column of this table shows a unique number, whereas the third column shows the binary map value of the category one-of-tag access right. If the user intends to access a database record, i.e., a row with a security of 100 (binary), the user access right must show exactly this setting, i.e., the user must have the SUPER access right. In embodiments, if a category access right is used, a "MLS_CATEGORY binary (N)" column is added, where N is the number of categories determined.

Table 206 illustrates the concept of the cohort access right. It is shown using the example of an organizational hierarchy of departments and units. The dependencies between the departments and units are shown using straight lines. For example, if a user may have access to the data of department DEP3, he may also have access to the data of unit UN1. If a user may have access to the data, i.e., rows comprising tags relating to of department DEP1, he may also have access to the data of the departments DEP3, UN2, UN3 and also UN1. The cohort access right is organized as any-of-tag. In embodiments, if a cohort access right is used for the source table, a "MLS_COHORT binary(M) is added, where M is the number of leaves.

Generally, the mapping of access rights may be done using the following rules: (i) each leaf in the cohort tree has a unique binary code assigned; (ii) the notes above the leaves are represented as bits obtained from summing up the leaves on nodes below them. As an example: DEP3=00001, DEP2, =11000, DEP1=00111, and ALL=11111.

Figure 3:
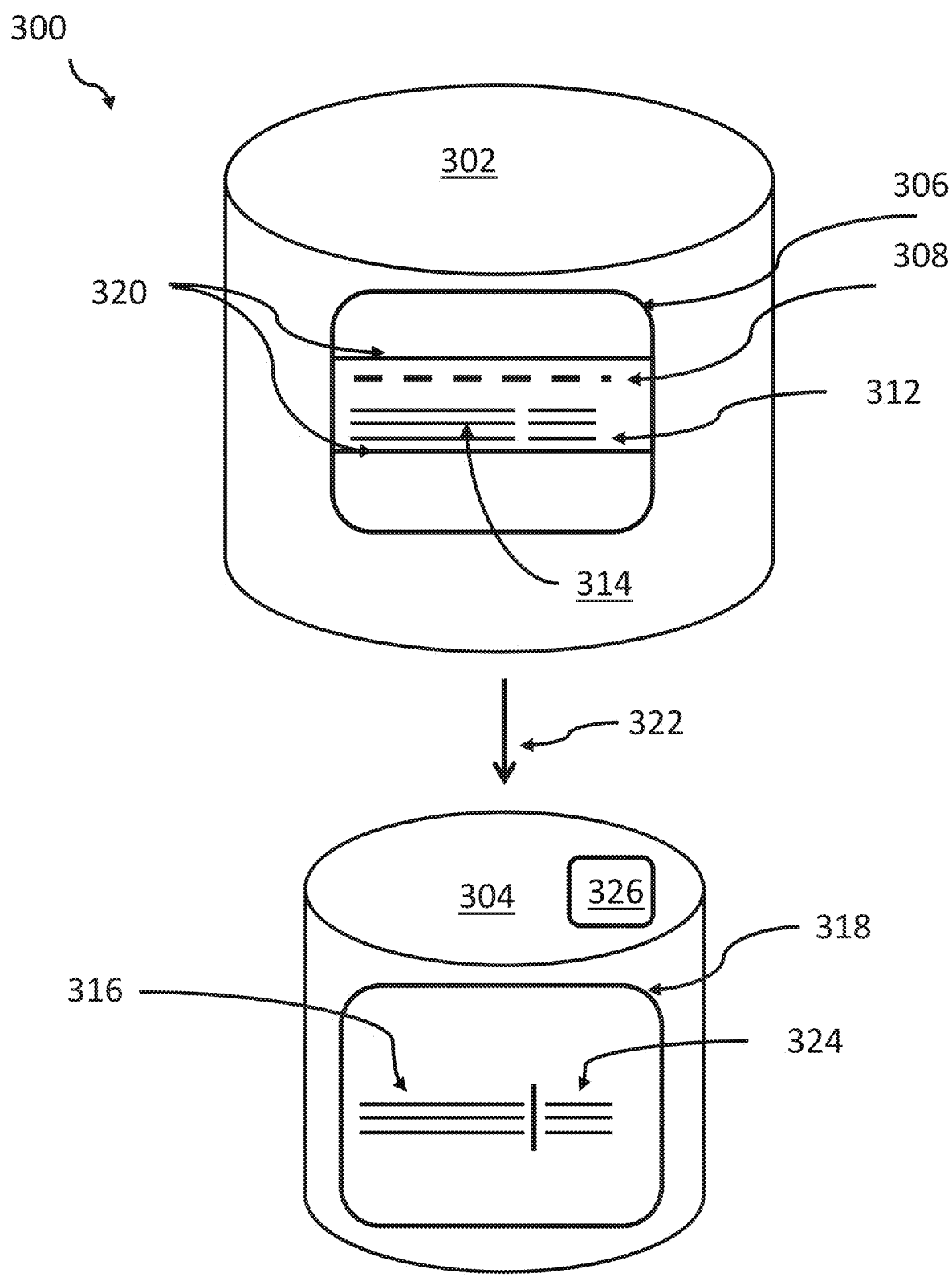
FIG. 3 shows a block diagram of an embodiment of a source and a target database.

FIG. 3 shows a block diagram 300 of a source database 302 and a target database 304. As an example, for one table 306 of the source database 302 an exemplary storage region/extent 320 (indicated by two horizontal lines) within the database table 306 is shown. The storage region 320 comprises a control record 308 (sometimes also denoted as zone map). Also, exemplary, rows 314 of the table 306 are shown. Furthermore, the row-level security information (multilevel security labels) is shown as 312.

The arrow 322 may indicate the process of migrating database content—i.e., the source table 306—to the target database 304 as new table 318. The table rows 316 correspond directly to the rows 314 with additional columns 324 (separated by a vertical line) added to the rows 316 operable for supporting multidimensional user access rights to the table 318 of the database 304, where such a fine-grained access right management is not natively supported by the target database 304. Additionally, a mapping table 326 is added to the target database 304, as discussed above. The mapping table is an additional table for mapping multi-level security with the structure discussed above. In embodiments of the present invention, when the data is migrated from the source table to the target table, the multi-level security metadata is added into the mapping table. For adding data to the mapping table by category, all known categories with bit codes are added. For adding data to the mapping table by cohort, all leaves and all nodes above them are added. When the source table data is migrated, each row migration tool determines its multi-level security labels and uses the above mapping rules for filling additional columns.

It may also be noted that the target database 304 is not equipped to manage storage regions/extents. Therefore, the zone map information/control record 308 information is not migrated directly to the target database 304.

Figure 4:
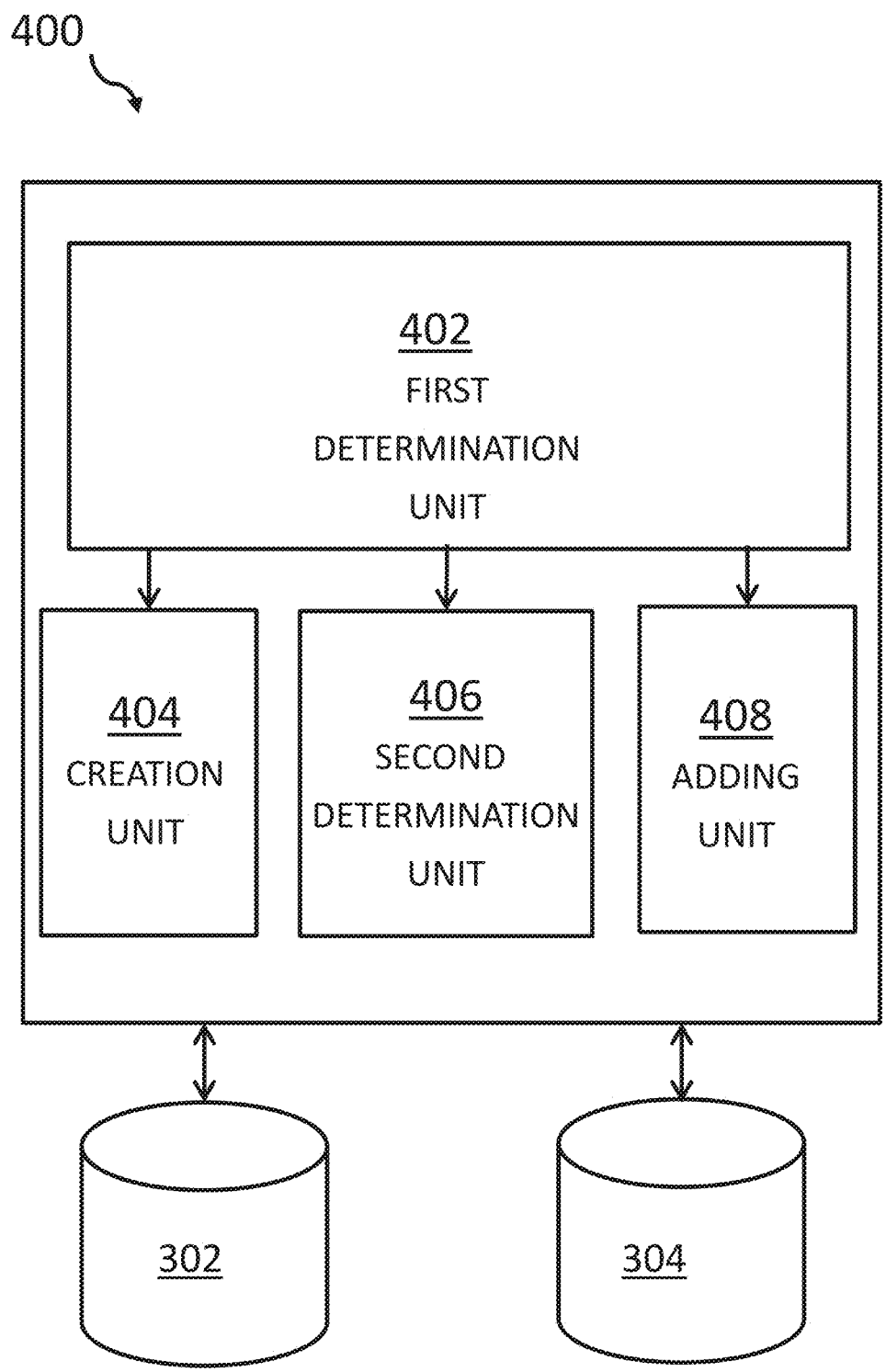
FIG. 4 shows a block diagram of an embodiment of the system for migrating database content with row-level security from a source database to a target database.

FIG. 4 shows a block diagram of an embodiment of the database migration system 400 for migrating database content with row-level security from a source database system 302 to a target database system 304 (as described with reference to FIG. 3). The data of the source database system 302 are organized in tables with rows and columns, i.e., a relational database. Additionally, the rows of a database table are grouped in storage regions, i.e., so-called extents. The system 400 comprises a first determination unit 402 adapted for determining a type of the source database to be migrated.

The first determination unit 402, upon determining that a source table of the source database is maintained using multi-level security attributes, is adapted to trigger the following units: a creation unit 404 adapted for creating a data structure for a source table of the source database for storing meta-data comprising the multi-level security attributes, a second determination unit 406 adapted for determining all dimensions of the multi-level security attributes of the source database 302, and an adding unit 408 adapted for adding columns to a target table of the target database relating to the source table, the added columns representing the multi-level security attributes of the source table.

Figure 5:
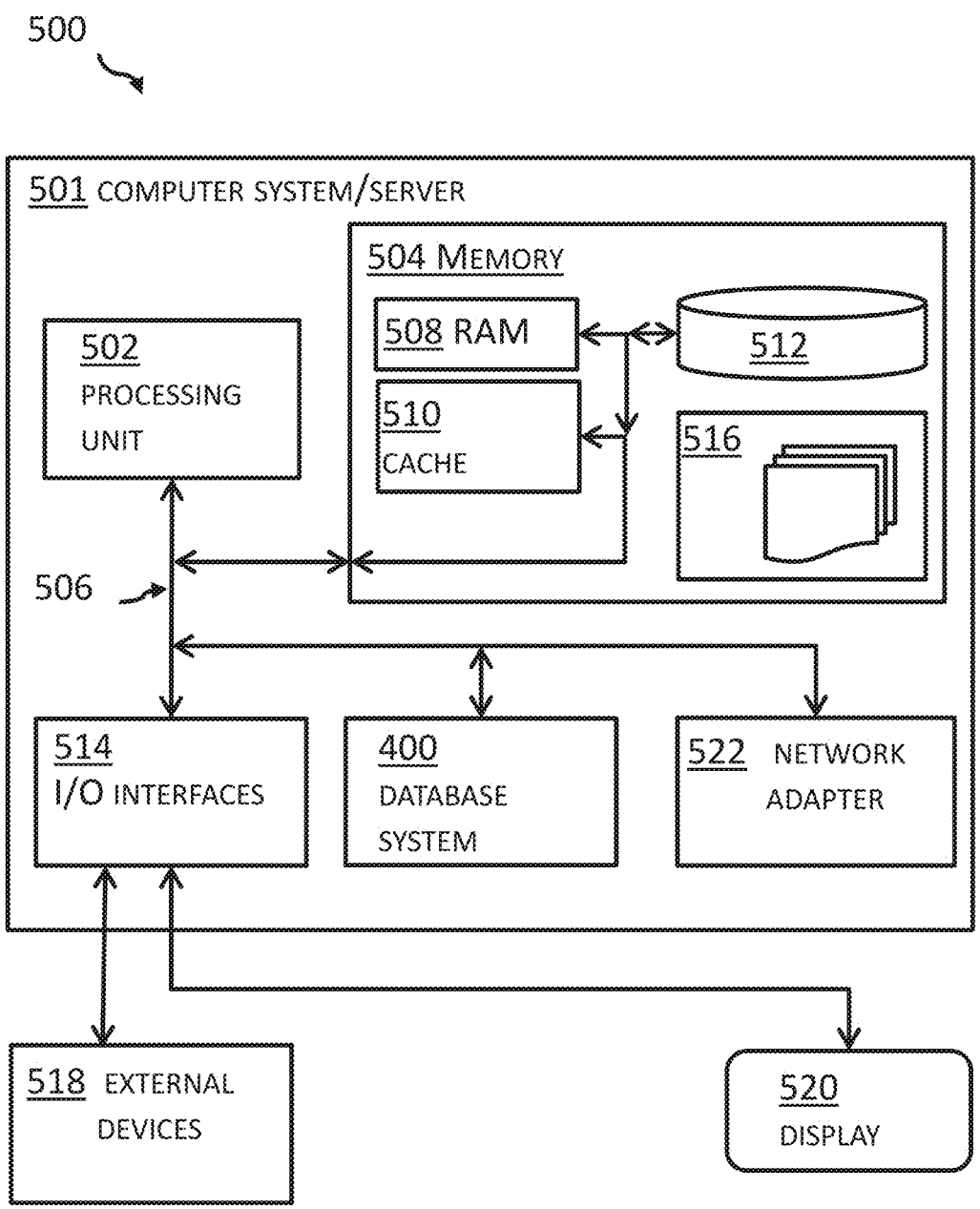
FIG. 5 shows an embodiment of a computing system comprising the system according to FIG. 4.

FIG. 5 shows, as an example, a computing system 500 suitable for executing program code related to the proposed method.

The computing system 500 is only one example of a suitable computer system, and is not intended to suggest any limitation as to the scope of use or functionality of embodiments of the invention described herein, regardless, whether the computing system 500 is capable of being implemented and/or performing any of the functionality set forth hereinabove. In the computing system 500, there are components, which are operational with numerous other general purpose or special purpose computing system environments or configurations. Examples of well-known computing systems, environments, and/or configurations that may be suitable for use with computing system 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computing system 500 may be described in the general context of computer system-executable instructions, such as program modules, being executed by a computing system 500. Generally, program modules may include routines, programs, objects, components, logic, data structures, and so on that perform particular tasks or implement particular abstract data types. Computing system 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 501 in computing system 500 is shown in the form of a general-purpose computing device. The components of computer system/server 501 may include, but are not limited to, one or more processors or processing units 502, a system memory 504, and a bus 506 that couple various system components including system memory 504 to the processing unit 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 501 typically includes a variety of computer system readable media. Such media may be any available media that is accessible by computer system/server 501, and it includes both, volatile and non-volatile media, removable and non-removable media.

The system memory 504 may include computer system readable media in the form of volatile memory, such as random access memory (RAM) 508 and/or cache memory 510. Computer system/server 501 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

The program/utility, having a set (at least one) of program modules 516, may be stored in memory 504 by way of example, and not limiting, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the invention, as described herein.

The computer system/server 501 may also communicate with one or more external devices 518 such as a keyboard, a pointing device, a display 520; one or more devices that enable a user to interact with computer system/server 501; and/or any devices (e.g., network card, modem, etc.) that enable computer system/server 501 to communicate with one or more other computing devices. Such communication can occur via Input/Output (I/O) interfaces 514. Still yet, computer system/server 501 may communicate with one or more networks such as a local area network (LAN), a general wide area network (WAN), and/or a public network (e.g., the Internet) via network adapter 522. As depicted, network adapter 522 may communicate with the other components of the computer system/server 501 via bus 506. It should be understood that, although not shown, other hardware and/or software components could be used in conjunction with computer system/server 501. Examples include, but are not limited to: microcode, device drivers, redundant processing units, external disk drive arrays, RAID systems, tape drives, and data archival storage systems, etc.

Additionally, in embodiments of the present invention, the database migration system 400, as discussed with embodiments of the present invention and with reference to FIG. 4, for migrating database content with row-level security is attached to the bus system 506.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

What is claimed is:

1. A computer-implemented method for migrating data with row-level security from a source database to a target database, said method comprising:
    determining that said data of said source database is arranged in tables with rows and columns, wherein said rows are grouped in storage regions comprising multi-level security attributes;
    determining a type of said source database to be migrated;
    responsive to determining that a source table of said source database is maintained using said multi-level security attributes:
        creating a data structure for a source table of said source database for storing meta-data comprising said multi-level security attributes;
        determining dimensions of said multi-level security attributes;
        adding columns to a target table of said target database relating to said source table, said added columns representing said multi-level security attributes of said source table;
        migrating said source table from said source database supporting row level security to said target database not supporting row-level security represented in said storage regions, wherein a mapping table is added as an additional table to said target database to determine a multi-level security label for adding level access right columns to said target database; and
        adding said multi-level security attributes to said mapping table.

2. The method according to claim 1, wherein in each of said storage regions a number of rows is stored defined by a block size of said database and a length of said rows such that a maximum number of rows fits into said storage region.

3. The method according to claim 1, further comprising:
    responsive to determining one of said dimensions comprises a level label indicative of a level access right, adding a level access right column to said table of said target table.

4. The method according to claim 1, further comprising:
    responsive to determining one of said dimensions comprises a category label indicative of a category level access right, adding a category access right column to said table of said target table, wherein said category access right column supports N different categories, determined during said step of determining dimensions of said multi-level security attributes.

5. The method according to claim 4, further comprising:
    responsive to determining that one of said dimensions comprises a cohort label indicative of a cohort access right, adding a level access right column to said table of said target table, wherein said level access right column supports M different leaves, determined during said step of determining dimensions of said multi-level security attributes.

6. The method according to claim 5, further comprising:
    adding a mapping table to said target database for mapping said multi-level security attributes with said following structure:
    TABLE MLS_MAPPING (,
    MLS_TYPE VARCHAR(10),
    MLS_BINARY binary(Z),
    MLS_LABEL,
    where Z is max (M, N)).

7. The method according to claim 6, further comprising:
    adding data into said mapping table MLS_MAPPING as follows:
    for a category access right: adding all determined categories with bit codes; and
    for a cohort access right: adding bit codes for all leaves and all nodes above them.

8. The method according to claim 1, further comprising:
    copying user data row-wise from said source table to said target table; and
    inserting said determined multi-level security attributes row-wise to said target table.

9. The method according to claim 1, wherein said target database is selected from the group consisting of a relational database, a column-based database, and a hierarchical database.

10. A database migration system for migrating data with row-level security from a source database system to a target database system, said system comprising:
    one or more computer processors;
    one or more computer readable storage devices;
    program instructions stored on the one or more computer readable storage devices for execution by at least one of the one or more computer processors, the stored program instructions comprising:
        program instructions to determine that said data of said source database is arranged in tables with rows and columns, wherein said rows are grouped in storage regions comprising multi-level security attributes;
        program instructions to determine a type of said source database to be migrated;
        responsive to determining that a source table of said source database is maintained using said multi-level security attributes;

program instructions to create a data structure for a source table of said source database for storing meta-data comprising said multi-level security attributes;

program instructions to determine dimensions of said multi-level security attributes;

program instructions to add columns to a target table of said target database relating to said source table, said added columns representing said multi-level security attributes of said source table;

program instructions to migrate said source table from said source database supporting row-level security to said target database not supporting row-level security represented in said storage regions, wherein a mapping table is added as an additional table to said target database to determine a multi-level security label for adding level access right columns to said target database; and adding said multi-level security attributes to said mapping table.

11. The database migration system according to claim 10, wherein in each of said storage regions a number of rows is storable defined by a block size of said database and a length of said rows such that a maximum number of rows fits into said storage region.

12. The database migration system according to claim 10, further comprising:

responsive to determining that one of said dimensions comprises a level label indicative of a level access right, program instructions to add a level access right column to said table of said target table.

13. The database migration system according to claim 10, further comprising:

responsive to determining one of said dimensions comprises a category label indicative of a category level access right, program instructions to add a category access right column to said table of said target table, wherein said category access right column supports N different categories, determined during said step of determining dimensions of said multi-level security attributes.

14. The database migration system according to claim 13, further comprising:

responsive to determining one of said dimensions comprises a cohort label indicative of a cohort access right, program instructions to add a level access right column to said table of said target table, wherein said level access right column supports M different leaves, determined during said step of determining dimensions of said multi-level security attributes.

15. The database migration system according to claim 14, further comprising:

program instructions to add a mapping table to said target database for mapping said multi-level security attributes with said following structure:
TABLE MLS_MAPPING (,
MLS_TYPE VARCHAR(10),
MLS_BINARY binary(Z),
MLS_LABEL,
where Z is max (M, N)).

16. The database migration system according to claim 15, further comprising:

program instructions to add data into said mapping table MLS_MAPPING as follows:
for a category access right: adding all determined categories with bit codes; and
for a cohort access right: adding bit codes for all leaves and all nodes above them.

17. The database migration system according to claim 10, further comprising:

program instructions to copy user data row-wise from said source table to said target table; and program instructions to insert said determined multi-level security attributes row-wise to said target table.

18. The database migration system according to claim 10, wherein said target database is selected from the group consisting of a relational database system, a column-based database system and a hierarchical database system.

19. A computer program product for migrating database content with row-level security from a source database to a target database, said computer program product comprising:

one or more computer readable storage devices having program instructions embodied therewith, said program instructions being executable by one or more computing systems to cause said one or more computing systems to:

determine that said data of said source database is arranged in tables with rows and columns, wherein said rows are grouped in storage regions comprising multi-level security attributes;

determine a type of said source database to be migrated;

responsive to determining that a source table of said source database is maintained using said multi-level security attributes;

create a data structure for a source table of said source database for storing meta-data comprising said multi-level security attributes;

determine dimensions of said multi-level security attributes;

add columns to a target table of said target database relating to said source table, said added columns representing said multi-level security attributes of said source table;

migrate said source table from said source database supporting row-level security to said target database not supporting row-level security represented in said storage regions, wherein a mapping table is added as an additional table to said target database to determine a multi-level security label for adding level access right columns to said target database; and add said multi-level security attributes to said mapping table.

20. The computer program product of claim 19, further comprising:

responsive to determining one of said dimensions comprises a level label indicative of a level access right, stored program instructions to add a level access right column to said table of said target table.

* * * * *